US008919775B2

(12) United States Patent
Wadds et al.

(10) Patent No.: US 8,919,775 B2
(45) **Date of Patent: *Dec. 30, 2014**

(54) SYSTEM FOR BILLING USAGE OF AN AUTOMATIC CARD HANDLING DEVICE

(71) Applicant: Bally Gaming, Inc., Las Vegas, NV (US)

(72) Inventors: Nathan Wadds, Las Vegas, NV (US); Colin Helsen, Henderson, NV (US); Zbigniew Czyzewski, Henderson, NV (US); James Helgesen, Eden Prairie, MN (US); Russ Marsden, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,875

(22) Filed: Oct. 1, 2012

(65) Prior Publication Data

US 2013/0045808 A1 Feb. 21, 2013

Related U.S. Application Data

(63) Continuation-in-part of application No. 11/558,818, filed on Nov. 10, 2006, now Pat. No. 8,616,552.

(51) Int. Cl.

| | |
|---|---|
| ***A63F 1/12*** | (2006.01) |
| ***A63F 1/14*** | (2006.01) |
| ***G06F 17/00*** | (2006.01) |
| ***G06F 19/00*** | (2011.01) |
| ***G07F 17/32*** | (2006.01) |
| *A63F 9/24* | (2006.01) |

(52) U.S. Cl.

CPC ........... *A63F 1/12* (2013.01); *A63F 2009/2411* (2013.01); *A63F 1/14* (2013.01); *G07F 17/3234* (2013.01); *G07F 17/32* (2013.01); *G07F 17/3293* (2013.01); *G07F 17/3225* (2013.01)

USPC ........................... 273/149 R; 463/25; 463/42

(58) Field of Classification Search

USPC ........................ 463/11–13, 16, 25, 29, 40–43; 273/149 R

See application file for complete search history.

(56) References Cited

U.S. PATENT DOCUMENTS 3,810,627 A 5/1974 Levy
3,909,002 A 9/1975 Levy (Continued)

FOREIGN PATENT DOCUMENTS

EP 1 502 631 A1 2/2005
WO WO 97/10577 3/1997

(Continued)

OTHER PUBLICATIONS

International Search Report for International Application No. PCT/US07/23168, dated Sep. 12, 2008, 3 pages.

(Continued)

*Primary Examiner* — Milap Shah

(74) *Attorney, Agent, or Firm* — TraskBritt; Philip J. Anderson

(57) ABSTRACT

An automatic card handling device, having a card handling device that includes a controller, the card handling device configured for shuffling an input set of cards and delivering an output set of cards resulting from the shuffling; and a communication module operably coupled to the controller, wherein the communication module is configured for sending and receiving information related to operation of the card handling device across a communication port configured for operable coupling to a cellular network, wherein the information related to the operation of the automatic card handling device includes information about the use of the card handling device; and wherein a factor in a usage fee for the card handling device is use of the card handling device.

16 Claims, 9 Drawing Sheets

(56) References Cited

U.S. PATENT DOCUMENTS

| | | | | |
|---|---|---|---|---|
| 4,339,798 | A | 7/1982 | Hedges et al. | |
| 4,467,424 | A | 8/1984 | Hedges et al. | |
| 4,531,187 | A | 7/1985 | Uhland | |
| 4,586,712 | A | 5/1986 | Lorber et al. | |
| 4,750,743 | A | 6/1988 | Nicoletti | |
| 4,755,941 | A | 7/1988 | Bacchi | |
| 4,807,884 | A | 2/1989 | Breeding | |
| 4,861,041 | A | 8/1989 | Jones et al. | |
| 5,197,094 | A * | 3/1993 | Tillery et al. | 463/25 |
| 5,224,712 | A | 7/1993 | Laughlin et al. | |
| 5,257,179 | A * | 10/1993 | DeMar | 463/25 |
| 5,288,081 | A | 2/1994 | Breeding | |
| 5,356,145 | A | 10/1994 | Verschoor | |
| 5,362,053 | A | 11/1994 | Miller | |
| 5,374,061 | A | 12/1994 | Albrecht | |
| 5,397,133 | A | 3/1995 | Penzias | |
| 5,584,483 | A | 12/1996 | Sines et al. | |
| 5,586,936 | A | 12/1996 | Bennett et al. | |
| 5,605,334 | A | 2/1997 | McCrea, Jr. | |
| 5,613,912 | A | 3/1997 | Slater | |
| 5,651,548 | A | 7/1997 | French et al. | |
| 5,669,816 | A | 9/1997 | Garczynski et al. | |
| 5,676,372 | A | 10/1997 | Sines et al. | |
| 5,681,039 | A | 10/1997 | Miller | |
| 5,707,286 | A | 1/1998 | Carlson | |
| 5,707,287 | A | 1/1998 | McCrea, Jr. | |
| 5,722,893 | A | 3/1998 | Hill et al. | |
| 5,735,525 | A | 4/1998 | McCrea, Jr. | |
| 5,735,742 | A | 4/1998 | French | |
| 5,743,798 | A | 4/1998 | Adams et al. | |
| 5,770,533 | A | 6/1998 | Franchi | |
| 5,772,505 | A | 6/1998 | Garczynski et al. | |
| 5,779,546 | A | 7/1998 | Meissner et al. | |
| 5,781,647 | A | 7/1998 | Fishbine et al. | |
| 5,911,626 | A | 6/1999 | McCrea, Jr. | |
| 5,919,090 | A | 7/1999 | Mothwurf | |
| 5,941,769 | A | 8/1999 | Order | |
| 5,985,305 | A | 11/1999 | Peery et al. | |
| 5,989,122 | A | 11/1999 | Roblejo | |
| 6,019,368 | A | 2/2000 | Sines et al. | |
| 6,039,650 | A | 3/2000 | Hill | |
| 6,068,258 | A * | 5/2000 | Breeding et al. | 273/149 R |
| 6,069,564 | A | 5/2000 | Hatano et al. | |
| 6,071,190 | A | 6/2000 | Weiss et al. | |
| 6,093,103 | A | 7/2000 | McCrea, Jr. | |
| 6,117,012 | A | 9/2000 | McCrea, Jr. | |
| 6,126,166 | A | 10/2000 | Lorson et al. | |
| 6,149,154 | A | 11/2000 | Grauzer et al. | |
| 6,154,131 | A | 11/2000 | Jones, II et al. | |
| 6,165,069 | A | 12/2000 | Sines et al. | |
| 6,183,362 | B1 | 2/2001 | Boushy | |
| 6,186,895 | B1 | 2/2001 | Oliver | |
| 6,200,218 | B1 | 3/2001 | Lindsay | |
| 6,210,274 | B1 | 4/2001 | Carlson | |
| 6,234,900 | B1 | 5/2001 | Cumbers | |
| 6,236,223 | B1 | 5/2001 | Brady et al. | |
| 6,250,632 | B1 | 6/2001 | Albrecht | |
| 6,254,002 | B1 | 7/2001 | Litman | |
| 6,254,484 | B1 | 7/2001 | McCrea, Jr. | |
| 6,257,981 | B1 | 7/2001 | Acres et al. | |
| 6,267,248 | B1 | 7/2001 | Johnson et al. | |
| 6,267,671 | B1 | 7/2001 | Hogan | |
| 6,270,404 | B2 | 8/2001 | Sines et al. | |
| 6,272,223 | B1 | 8/2001 | Carlson | |
| 6,293,546 | B1 * | 9/2001 | Hessing et al. | 273/138.2 |
| 6,299,167 | B1 | 10/2001 | Sines et al. | |
| 6,299,534 | B1 | 10/2001 | Breeding et al. | |
| 6,299,536 | B1 | 10/2001 | Hill | |
| 6,342,830 | B1 | 1/2002 | Want et al. | |
| 6,346,044 | B1 | 2/2002 | McCrea, Jr. | |
| 6,403,908 | B2 | 6/2002 | Stardust et al. | |
| 6,446,864 | B1 | 9/2002 | Kim et al. | |
| 6,460,848 | B1 | 10/2002 | Soltys et al. | |
| 6,517,435 | B2 | 2/2003 | Soltys et al. | |
| 6,517,436 | B2 | 2/2003 | Soltys et al. | |
| 6,520,857 | B2 | 2/2003 | Soltys et al. | |
| 6,527,271 | B2 | 3/2003 | Soltys et al. | |
| 6,530,836 | B2 | 3/2003 | Soltys et al. | |
| 6,530,837 | B2 | 3/2003 | Soltys et al. | |
| 6,533,276 | B2 | 3/2003 | Soltys et al. | |
| 6,533,662 | B2 | 3/2003 | Soltys et al. | |
| 6,579,180 | B2 | 6/2003 | Soltys et al. | |
| 6,579,181 | B2 | 6/2003 | Soltys et al. | |
| 6,582,301 | B2 | 6/2003 | Hill | |
| 6,588,751 | B1 * | 7/2003 | Grauzer et al. | 273/149 R |
| 6,595,857 | B2 | 7/2003 | Soltys et al. | |
| 6,629,894 | B1 | 10/2003 | Purton | |
| 6,638,161 | B2 | 10/2003 | Soltys et al. | |
| 6,652,379 | B2 | 11/2003 | Soltys et al. | |
| 6,655,684 | B2 | 12/2003 | Grauzer et al. | |
| 6,663,490 | B2 | 12/2003 | Soltys et al. | |
| 6,676,127 | B2 | 1/2004 | Johnson et al. | |
| 6,676,517 | B2 | 1/2004 | Beavers | |
| 6,685,568 | B2 | 2/2004 | Soltys et al. | |
| 6,688,979 | B2 | 2/2004 | Soltys et al. | |
| 6,712,696 | B2 | 3/2004 | Soltys et al. | |
| 6,726,205 | B1 | 4/2004 | Purton | |
| 6,749,510 | B2 | 6/2004 | Giobbi | |
| 6,758,751 | B2 | 7/2004 | Soltys et al. | |
| 6,774,782 | B2 | 8/2004 | Runyon et al. | |
| 6,834,251 | B1 | 12/2004 | Fletcher | |
| 6,848,616 | B2 | 2/2005 | Tsirline et al. | |
| 6,848,994 | B1 | 2/2005 | Knust et al. | |
| 6,857,961 | B2 | 2/2005 | Soltys et al. | |
| 6,893,347 | B1 | 5/2005 | Zilliacus et al. | |
| 6,899,628 | B2 | 5/2005 | Leen et al. | |
| 6,964,612 | B2 | 11/2005 | Soltys et al. | |
| 7,011,309 | B2 | 3/2006 | Soltys et al. | |
| 7,029,009 | B2 | 4/2006 | Grauzer et al. | |
| 7,036,818 | B2 | 5/2006 | Grauzer et al. | |
| 7,059,602 | B2 | 6/2006 | Grauzer et al. | |
| 7,073,791 | B2 | 7/2006 | Grauzer et al. | |
| 7,084,769 | B2 | 8/2006 | Bauer et al. | |
| 7,106,201 | B2 | 9/2006 | Tuttle | |
| 7,113,094 | B2 | 9/2006 | Garber et al. | |
| 7,114,718 | B2 | 10/2006 | Grauzer et al. | |
| 7,128,652 | B1 | 10/2006 | Lavoie et al. | |
| 7,186,181 | B2 | 3/2007 | Rowe | |
| 7,203,841 | B2 | 4/2007 | Jackson et al. | |
| 7,297,062 | B2 | 11/2007 | Gatto et al. | |
| 7,300,056 | B2 | 11/2007 | Gioia et al. | |
| 7,303,473 | B2 | 12/2007 | Rowe | |
| 7,316,615 | B2 | 1/2008 | Soltys et al. | |
| 7,390,256 | B2 | 6/2008 | Soltys et al. | |
| 7,510,478 | B2 | 3/2009 | Benbrahim et al. | |
| 7,515,718 | B2 | 4/2009 | Nguyen et al. | |
| 7,666,090 | B2 * | 2/2010 | Hettinger | 463/25 |
| 7,686,681 | B2 | 3/2010 | Soltys et al. | |
| 7,699,694 | B2 | 4/2010 | Hill | |
| 7,744,452 | B2 | 6/2010 | Cimring et al. | |
| 7,780,529 | B2 | 8/2010 | Rowe et al. | |
| 7,890,365 | B2 * | 2/2011 | Hettinger | 705/14.12 |
| 7,908,169 | B2 * | 3/2011 | Hettinger | 705/14.12 |
| 7,909,689 | B2 | 3/2011 | Lardie | |
| 7,931,533 | B2 | 4/2011 | LeMay et al. | |
| 7,988,554 | B2 | 8/2011 | LeMay et al. | |
| 8,016,663 | B2 | 9/2011 | Soltys et al. | |
| 8,062,134 | B2 | 11/2011 | Kelly et al. | |
| 8,092,307 | B2 | 1/2012 | Kelly | |
| 8,092,309 | B2 | 1/2012 | Bickley | |
| 8,337,296 | B2 * | 12/2012 | Grauzer et al. | 463/29 |
| 2002/0068635 | A1 | 6/2002 | Hill | |
| 2002/0094869 | A1 | 7/2002 | Harkham | |
| 2002/0107072 | A1 * | 8/2002 | Giobbi | 463/42 |
| 2002/0113368 | A1 | 8/2002 | Hessing et al. | |
| 2002/0142820 | A1 | 10/2002 | Bartlett | |
| 2002/0187830 | A1 | 12/2002 | Stockdale et al. | |
| 2003/0003997 | A1 | 1/2003 | Vuong et al. | |
| 2003/0064798 | A1 | 4/2003 | Grauzer et al. | |
| 2003/0067112 | A1 | 4/2003 | Grauzer et al. | |
| 2003/0151194 | A1 | 8/2003 | Hessing et al. | |
| 2003/0195025 | A1 | 10/2003 | Hill | |
| 2004/0015423 | A1 * | 1/2004 | Walker et al. | 705/34 |
| 2004/0067789 | A1 | 4/2004 | Grauzer et al. | |

(56) References Cited

U.S. PATENT DOCUMENTS

| | | | | |
|---|---|---|---|---|
| 2004/0100026 | A1 | 5/2004 | Haggard | |
| 2004/0180722 | A1 | 9/2004 | Giobbi | |
| 2004/0224777 | A1 | 11/2004 | Smith et al. | |
| 2005/0026680 | A1 | 2/2005 | Gururajan | |
| 2005/0051955 | A1 | 3/2005 | Schubert et al. | |
| 2005/0051965 | A1 | 3/2005 | Gururajan | |
| 2005/0082750 | A1 | 4/2005 | Grauzer et al. | |
| 2005/0104290 | A1 | 5/2005 | Grauzer et al. | |
| 2005/0110210 | A1 | 5/2005 | Soltys et al. | |
| 2005/0113171 | A1 | 5/2005 | Hodgson | |
| 2005/0137005 | A1 | 6/2005 | Soltys et al. | |
| 2005/0192092 | A1 | 9/2005 | Breckner et al. | |
| 2005/0242500 | A1 | 11/2005 | Downs, III | |
| 2005/0272501 | A1 | 12/2005 | Tran et al. | |
| 2005/0288083 | A1 | 12/2005 | Downs, III | |
| 2005/0288086 | A1 | 12/2005 | Schubert et al. | |
| 2006/0063577 | A1 | 3/2006 | Downs, III et al. | |
| 2006/0183540 | A1 | 8/2006 | Grauzer et al. | |
| 2006/0189381 | A1 | 8/2006 | Daniel et al. | |
| 2006/0199649 | A1 | 9/2006 | Soltys et al. | |
| 2006/0205508 | A1 | 9/2006 | Green | |
| 2006/0252521 | A1 | 11/2006 | Gururajan et al. | |
| 2006/0252554 | A1 | 11/2006 | Gururajan et al. | |
| 2007/0072677 | A1 | 3/2007 | Lavoie et al. | |
| 2007/0184905 | A1 | 8/2007 | Gatto et al. | |
| 2007/0197294 | A1 | 8/2007 | Gong | |
| 2007/0197298 | A1 | 8/2007 | Rowe | |
| 2007/0202941 | A1 | 8/2007 | Miltenberger et al. | |
| 2007/0259709 | A1 | 11/2007 | Kelly et al. | |
| 2008/0032763 | A1 | 2/2008 | Giobbi | |
| 2008/0039192 | A1 | 2/2008 | Laut | |
| 2008/0039208 | A1 | 2/2008 | Abrink et al. | |
| 2008/0096656 | A1 | 4/2008 | LeMay et al. | |
| 2008/0113700 | A1 | 5/2008 | Czyzewski et al. | |
| 2008/0113783 | A1 | 5/2008 | Czyzewski | |
| 2008/0176627 | A1 | 7/2008 | Lardie | |
| 2008/0234046 | A1 * | 9/2008 | Kinsley | 463/40 |
| 2008/0234047 | A1 * | 9/2008 | Nguyen | 463/42 |
| 2008/0248875 | A1 | 10/2008 | Beatty | |
| 2009/0100409 | A1 | 4/2009 | Toneguzzo | |
| 2009/0224476 | A1 | 9/2009 | Grauzer et al. | |
| 2009/0298577 | A1 | 12/2009 | Gagner et al. | |
| 2009/0312093 | A1 * | 12/2009 | Walker et al. | 463/25 |
| 2010/0048304 | A1 | 2/2010 | Boesen | |
| 2010/0069155 | A1 | 3/2010 | Schwartz et al. | |
| 2010/0178987 | A1 | 7/2010 | Pacey | |
| 2010/0197410 | A1 | 8/2010 | Leen et al. | |
| 2010/0234110 | A1 | 9/2010 | Clarkson | |
| 2010/0240440 | A1 | 9/2010 | Szrek et al. | |
| 2010/0255899 | A1 | 10/2010 | Paulsen | |
| 2011/0105208 | A1 | 5/2011 | Bickley | |
| 2011/0130190 | A1 | 6/2011 | Hamman et al. | |
| 2011/0159952 | A1 | 6/2011 | Kerr | |
| 2011/0159953 | A1 | 6/2011 | Kerr | |
| 2011/0165936 | A1 | 7/2011 | Kerr | |
| 2011/0172008 | A1 | 7/2011 | Alderucci | |
| 2011/0183748 | A1 | 7/2011 | Wilson et al. | |
| 2011/0230268 | A1 | 9/2011 | Williams | |
| 2011/0269529 | A1 | 11/2011 | Baerlocher | |
| 2011/0287829 | A1 | 11/2011 | Clarkson et al. | |
| 2012/0015724 | A1 | 1/2012 | Ocko et al. | |
| 2012/0015725 | A1 | 1/2012 | Ocko et al. | |
| 2012/0015743 | A1 | 1/2012 | Lam et al. | |
| 2012/0015747 | A1 | 1/2012 | Ocko et al. | |
| 2012/0021835 | A1 | 1/2012 | Keller et al. | |
| 2012/0034977 | A1 | 2/2012 | Kammler | |

FOREIGN PATENT DOCUMENTS

| | | | |
|---|---|---|---|
| WO | WO 2004/112923 | A1 | 12/2004 |
| WO | 2008/005286 | A2 | 1/2008 |

OTHER PUBLICATIONS

PCT International Search Report for PCT/US2007/022894, dated Jun. 11, 2008, 2 pages.

Shuffle Master Gaming, Service Manual, ACE™ Single Deck Card Shuffler, 63 pages, © 1998.

Shuffle Master Gaming, Service Manual, Let It Ride Bonus® With Universal Keypad, 112 pages, © 2000 Shuffle Master, Inc.

Written Opinion of the International Searching Authority for International Application No. PCT/US2007/022858, mailed Apr. 18, 2008, 5 pages.

Notification of Transmittal of International Preliminary Examination Report for corresponding International Application No. PCT/US02/31105 filed Sep. 27, 2002.

PCT International Search Report and Written Opinion, PCT Application No. PCT/US2013/062391, Dec. 17, 2013, 13 pages.

* cited by examiner

SYSTEM FOR BILLING USAGE OF AN AUTOMATIC CARD HANDLING DEVICE

CROSS-REFERENCE TO RELATED APPLICATIONS

This application is a continuation-in-part of U.S. patent application Ser. No. 11/558,818, filed on Nov. 10, 2006, which is hereby incorporated herein in its entirety by this reference.

This application is related to U.S. patent application Ser. No. 11/558,810, filed Nov. 10, 2006, titled "Casino Table Game Monitoring System," now abandoned; U.S. patent application Ser. No. 11/558,817, filed Nov. 10, 2006, titled "Method and Apparatus Providing Gaming Table with RFID Antennas and Shielding," now abandoned; and U.S. patent application Ser. No. 11/558,823, filed Nov. 10, 2006, titled "Casino Card Shoes, Systems and Methods for a No Peek Feature," now abandoned, the content of each of which are all hereby incorporated herein in its entirety by this reference.

TECHNICAL FIELD

This disclosure relates generally to playing card handling devices and, more specifically, to apparatuses comprising an automatic card handling device for use in a cellular network.

BACKGROUND

Card handling devices used in the gaming industry are used for increasing the efficiency, security and game speed in live table games such as blackjack, baccarat and various forms of poker. Card handling devices, such as card shufflers, may perform a variety of functions including randomly shuffling one or more decks of playing cards in an efficient and thorough manner. In a live table game, it is important that the playing cards are shuffled in an efficient and thorough manner to prevent players from having an advantage by knowing the position of specific cards or groups of cards in the final arrangement of cards delivered in the play of the game. Additionally, it is advantageous to have the playing cards shuffled in a very short period of time in order to minimize any delay in the play of the game.

There is a need for methods and apparatuses to provide increased system efficiency, reliability, and use details of a card handling devices.

SUMMARY

Embodiments include an automatic card handling device that, in one embodiment, comprises a shuffling apparatus that is configured for shuffling an input set of cards and delivering an output set of cards resulting from the shuffling. The automatic card handling device further comprises a detection module configured for recognizing a rank and suit of each card of the output set of cards. The detection module recognizes the rank and suit prior to removal of the output set of cards from the shuffling apparatus. Further included in the automatic card handling device is a communications module that may communicate to remote computers or servers over public cellular networks.

The communications module is configured for sending and receiving information related to operation of the automatic card handling device across a communication port that is configured for operable coupling to a communication network, e.g., a cellular network. Information about the automatic card handling device, e.g., usage information, maintenance information, mechanical information, etc., can be sent to a data module to prepare reports (typically formatted data packets), such as detailed usage reports that enable the automatic card handling device to be licensed/billed based on use-based models rather than fixed-time-period models. One example of a fixed-time-period model would be leasing a smart shuffler for $/month, regardless of actual use. For the purposes of this disclosure, when a "$" sign is used it is understood to conceptually include any recognized monetary system and its symbol including, but not limited to, €, ¥, £, ₣, ₤, ₱, ৳, Rs, ₩, ₪, etc. Examples of use-based models include, but are not limited to, $/minute of powered-up time, $/card shuffled, $/card delivered, $/game-play (game-play refers to a single game play sequence, such as one game of blackjack from start to finish including any number of current players), $/game-play/player (same as game-play, but the charge rate includes an adder for each player), $/game-session (a game-session is a sequence of game-plays where each game play is the same game and the time interval between each game-play is short—seconds, not minutes or hours), $/game-session/average-player-count (same as $/game-session, coupled with an adder for each additional player where the number of players is averaged over a game session), $/card-count, $/deck-check, etc. Some embodiments may include the ability to not only charge for each type of use event, but further to combine, or periodically total, charges based on multiple types of use events that occur in one billing period.

The data module can also receive maintenance and/or mechanical information about the automatic card handling device internals to prepare a report, alert, alarm and/or other notification based on the information. In some embodiments, the data module receives information from internal components. In other embodiments, the data module may periodically collect information using polling methods, flushing specified error or status buffers, or other methods, and collect and format the data for transmission.

The data may be collected, formatted, and sent as a result of a request for the information received at the data module from an external source, typically a centralized server used to access and, in some embodiments, further process the card handling device ("smart shuffler," if the device is a shuffler) data. The data may be collected, formatted, and/or sent as a result of an internal request as well. Internal requests may be of any form, including time-based and/or timer-based requests, based on the occurrence or recognition of a specified set of detected or reported error conditions, and/or sent internally as specifically requested by other internal modules.

The figures depict various embodiments for purposes of illustration only. One skilled in the art who also has the benefit of this disclosure may recognize from the following discussion that alternative embodiments of the structures and methods illustrated herein may be employed without departing from the principles described herein.

DETAILED DESCRIPTION

The present disclosure illustrates, in various embodiments, apparatuses and methods of operation for an automatic card handling device having cellular network capabilities (this includes card handling devices that have other network interfaces having similar capabilities as public cellular networks).

In the following description, circuits and functions may be shown in block diagram form in order not to obscure the descriptions in unnecessary detail. Conversely, specific circuit implementations shown and described are examples only and should not be construed as the only way to implement cellular shufflers unless specified otherwise herein. Additionally, block definitions and partitioning of logic between various blocks illustrates one possible embodiment. It may become apparent to one of skill in the art, who also has the benefit of this disclosure, that the embodiments disclosed may be practiced by various other partitioning solutions, all of which are contemplated herein.

Further, the term "module" is used herein in a non-limiting sense and solely to indicate functionality of particular circuits and/or assemblies within embodiments of cellular card handling devices, and is not be construed as requiring a particular physical structure, or particular partitioning between elements for performing the indicated functions.

When executed as firmware or software, the instructions for performing the methods and processes described herein may be stored on a computer readable medium. A computer readable medium includes, but is not limited to, magnetic and optical storage devices such as disk drives, magnetic tape, CDs (compact discs), DVDs (digital versatile discs or digital video discs), and semiconductor devices such as RAM, DRAM, ROM, EPROM, and Flash memory.

Figure 1:
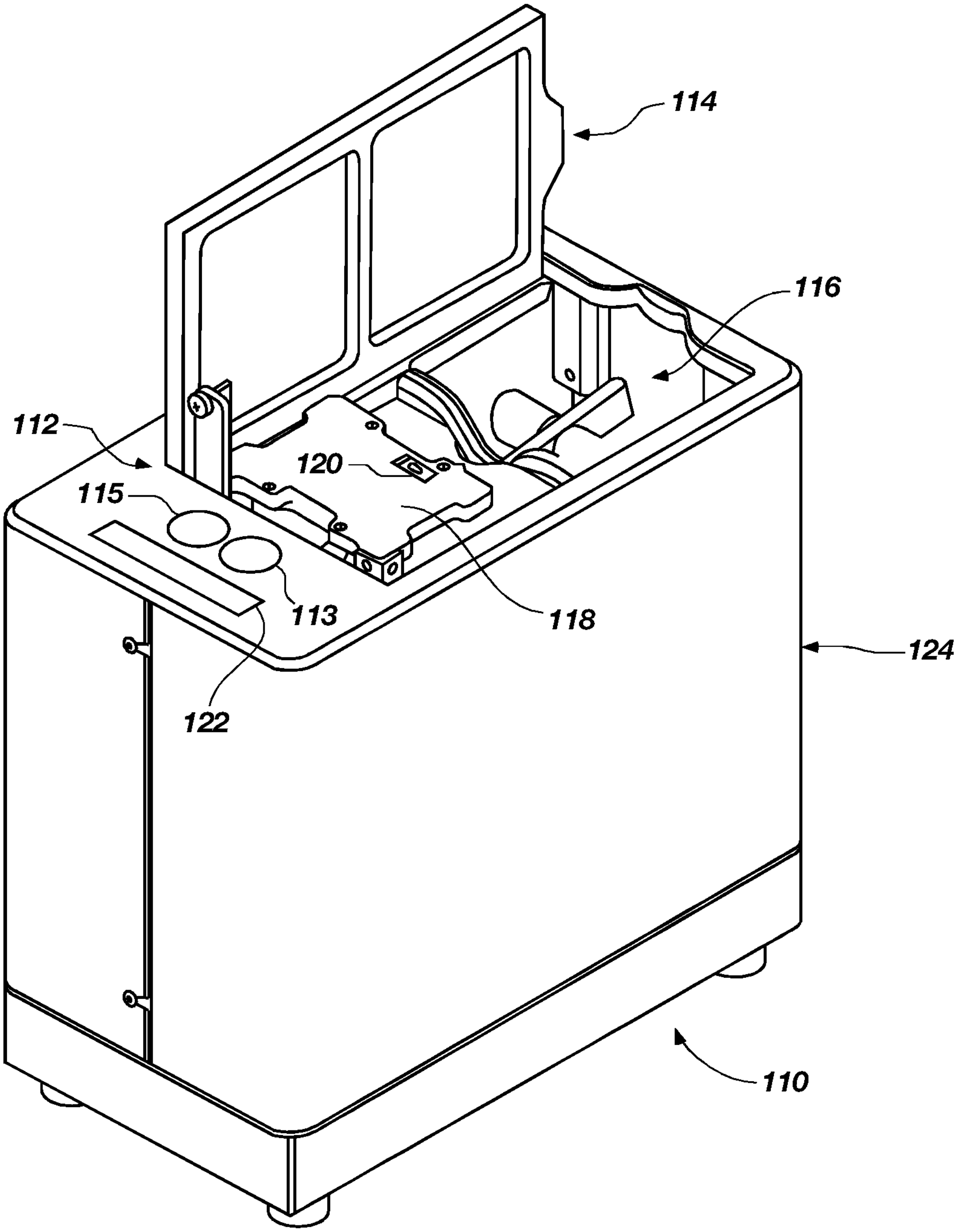
FIG. 1 is an illustration of one embodiment of an automatic ("smart") card handling device.

FIG. 1 illustrates a card handling device 110. A top surface 112 of card handling device 110 may comprise a flip-up cover 114 which, when opened, exposes a card insertion area 116 and an elevator platform 118. Card insertion area 116 may be configured to receive an input set of cards to be shuffled, counted, and/or sorted. In one example, card handling device 110 may be configured to receive, read rank and suit, sort, and shuffle multiple, e.g., up to 8, decks of cards at any one time. Elevator platform 118 may be configured to raise a set of shuffled cards to a level where they can be removed by a device user after the shuffling, reading, and/or sorting processes are completed. Elevator platform 118 may include a sensor 120, which detects the presence of cards or other objects located on elevator platform 118. A camera 142 or a card recognition module 146 (see FIGS. 2 and 3) may also be included within the body 124 of card handling device 110. Card handling device 110 may be located adjacent to or flush-mounted into a gaming table in a casino where a live card game is taking place, or may be located in a remote location off the casino floor, which is inaccessible to the public.

Card handling device 110 may also be configured to display operational data relating to the device to a display panel 122 located on top surface 112. A casino employee using the card handling device 110 may monitor display panel 122 and view the displayed information in order to know the status of operation of the card handling device 110. Such information displayed on display panel 122 may include the number of cards present in the card handling device 110, the status of any shuffling, reading, or sorting operations, security information relating to the card handling device 110, status relating to a card verification process, or any other information about errors, or the operation of card handling device 110 that would be useful to a user. Buttons 113, 115, located adjacent display panel 122 may be "on-off" buttons, special function buttons (e.g., raise elevator to the card delivery position, reshuffle demand, security check, card count demand, etc.), and the like.

Figure 2:
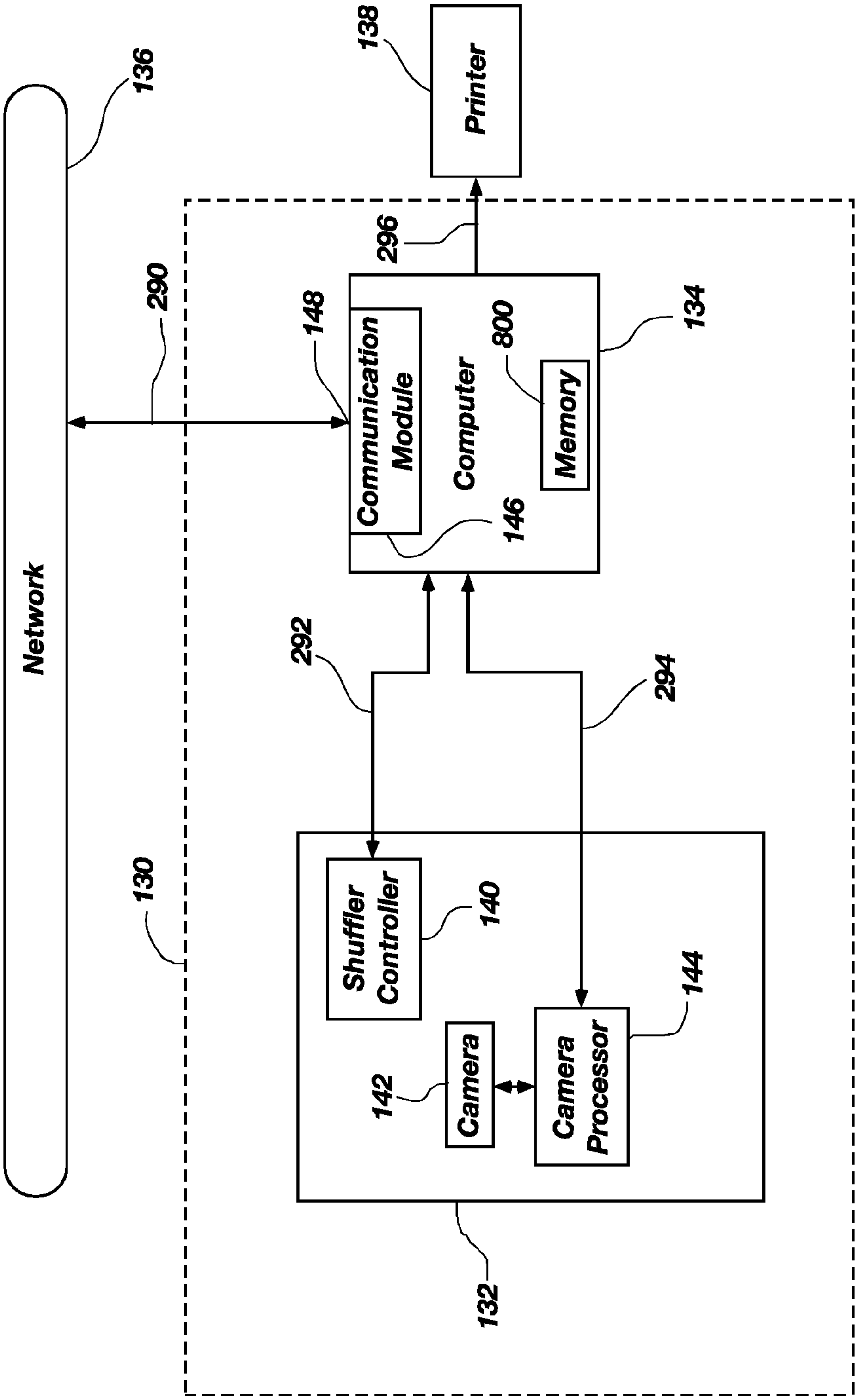
FIG. 2 is a block diagram of an automatic card handling device operably coupled to a local network.

FIG. 2 illustrates an embodiment of a card handling device 130 comprising a shuffler 132 operably connected to a computer 134. Computer 134 may be any operable implementation including, but not limited to, a chip or chipset that supports public cellular communications capabilities. One example is Qualcomm's Snapdragon series of chips (other manufacturers, such as Intel, also sell chips that enable public cellular telephony communications). Other embodiments may include several components, of which a subset may be the QUALCOMM® or INTEL® chips already mentioned. Shuffler 132 may include a shuffler controller 140, and a camera processor 144 operably coupled to camera 142. Shuffler controller 140 and camera processor 144 are both operably coupled to computer 134 by connections 292 and 294, respectively. Computer 134 may comprise a communication module 146 and a communication port 148 configured for operable coupling to network 136 via communication link 290. Computer 134 may also be operably coupled to printer 138 via communication link 296 or via network 136.

Network 136 may comprise a local network or a wide area network, such as the Internet, cellular phone network or some combination of networks. Communication links 290 and 296 may comprise any form of wireless or wired connections or any combination thereof. By way of example and not limitation, communication links 290 and 296 may be comprised of serial data links, parallel data links, USB, Ethernet, a Wide Area Network (WAN), a Local Area Network (LAN), infrared communication, IEEE 802.16 (or WiMax), IEEE 802.11a/b/g/n/p, Wi-Fi, and in particular for one embodiment, any public cellular phone network including, but not limited to, GSM, CDMA, 3G, or 3GPP Long Term Evolution (LTE), communication, etc. It is envisioned that other communications technologies, especially those used for public telephony, can also be used as they are developed in the future.

As described in more detail below, communication module 146 may be configured to establish communication with network 136 and thereafter send and receive information to and from network 136 across communication port 148.

In some embodiments, communication module 146 and memory 800 reside within the shuffler 132; in others, the communication module 146 and memory 800 may be in a separate enclosure. In all embodiments, communication module 146 is in operable communication with shuffler controller 140. In some embodiments, other modules or components of the shuffler 132 may also be in communication with communication module 146 in addition to the shuffler controller 140.

In one embodiment, upon shuffler 132 receiving an input set of cards, shuffler controller 140 is configured to count the cards and, as the cards are being counted, camera 142 is configured to take a picture of at least a portion of each counted card. Thereafter, data representing pictures and a card count are sent to computer 134, which iterates through the pictures and extracts the card value from the picture of each card. In another embodiment, the information is sent to a one or more computing device(s) across a WAN (e.g., Internet and/or cellular network). Computer 134 then generates information relating to the input set of cards by associating the value of each individual card with its counted position in the deck. The card information is then used by the computer 134 to verify the contents of the deck by comparing the information relating to the input set of cards to information relating to a standard deck of cards stored in the memory 800 of computer 134. Computer 134 may be configured to operate in multiple modes and may be capable of automatically switching between multiple modes without powering off or rebooting. By way of example, computer 134 may be configured to operate in a set-up mode, ran mode, or a service mode, as are explained more fully below.

As described above, card handling device 130 is configured to display, on display panel 122 (see FIG. 1), any data pertaining to the operation of card handling device 130. Card handling device 130 may be further configured to convert the aforementioned operational data into electronic data signals comprising information such as, repair-related data, data related to current or past operation and use, the serial number of the card handling device 130, the serial numbers of device parts, physical location of card handling device 130, performance, usage, or any other data related to card handling device 130. At any time after communication has been established by computer 134, communication module 146 may transmit the information through communication port 148 and across network 136 via communication link 290. As described in greater detail below, the information may then be transmitted to a server 162 where the data can be viewed by a device operator, stored, mined, or forwarded to casino personnel or a service center 168 (see FIGS. 5 and 6). Additionally, computer 134 may be configured to send information comprising the shuffling and card verification results to a printer 138 via communication link 296. Printer 138 may be configured to, upon receipt of the information, print a label with the verification results, which may then be affixed to the output set of cards, for example. The printer 138 could also print a wide variety of messages, such as service requests, hours of operation, number of batches of cards shuffled, particular cards missing, and the like.

Figure 3A:
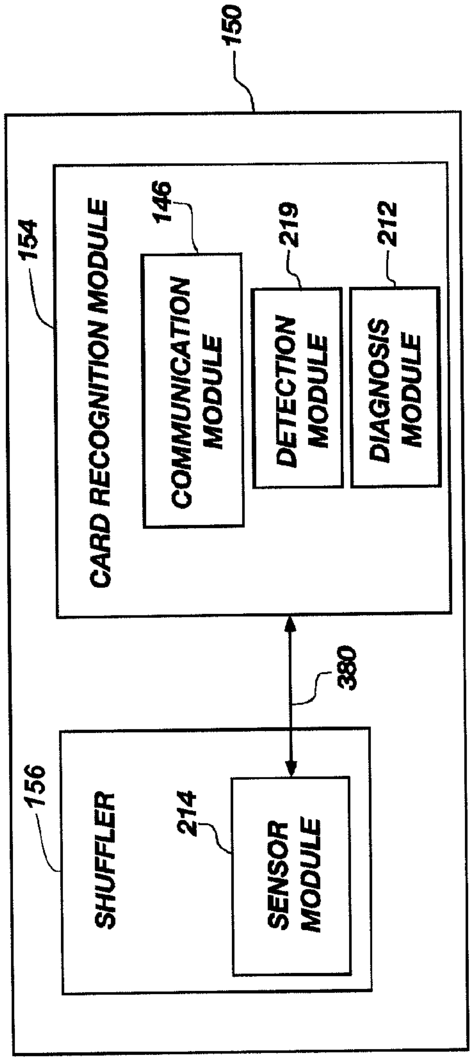
FIGS. 3(*a*) through 3(*c*) are block diagrams of an embodiment of an automatic card handling device.
Figure 3C:
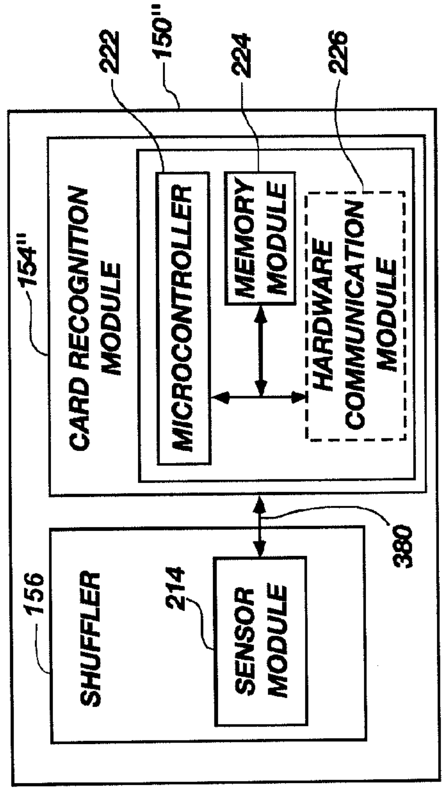
Figure 3B:
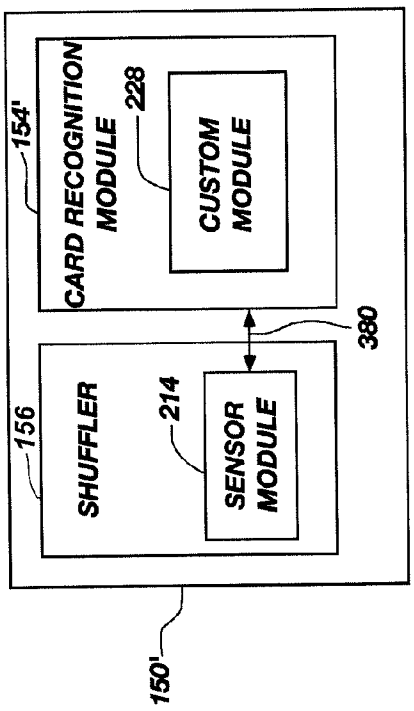

FIGS. 3(*a*) through 3(*c*) illustrate various embodiments of card handling device 150. FIG. 3(*a*) illustrates a logical partitioning of functions within the card recognition module 154, whereas FIGS. 3(*b*) and 3(*c*) illustrate different embodiments of physical partitioning of the card recognition module 154. Of course, these partitioning solutions, both logical and physical, are example solutions; other embodiments with different partitioning solutions are fully contemplated.

As illustrated in the logical partitioning of FIG. 3(*a*), card handling device 150 includes a shuffler 156 and a card recognition module 154. Shuffler 156 includes a sensor module 214 that is operably coupled to card recognition module 154 via connection 380 and is configured for sensing image information about each card included in an input set of cards. The sensor module 214 may include, for example, a two-dimensional CMOS image sensor, a two-dimensional charge coupled device (CCD) image sensor, or a one-dimensional line sensor, as are known by those in the art. Card recognition module 154 comprises a communication module 146 configured for establishing communication with a local network or a world-wide network, including a public cellular network. Communication module 146 may be further transmit and receive information over the network. Further included in card recognition module 154 is a detection module 219 configured for verifying the contents of an input set of cards, and a diagnosis module 212 configured for performing a self-diagnosis on the operation of card handling device 150, as are explained more fully below.

FIG. 3(*b*) illustrates a physical partitioning embodiment of card handling device 150' wherein the card recognition module 154' comprises a custom module 228 including custom logic configured to establish communication with a network and thereafter transmit and receive information over the network. The custom module 228 may include logic configured for performing the functions of the communication module 146, the detection module 219, and the diagnosis module 212. By way of example and not limitation, the custom module 228 may be implemented as a custom application specific integrated circuit (ASIC), a field programmable gate array (FPGA), one or more programmable logic devices (PLDs) and similar devices for implementing custom logic as are known to those of ordinary skill in the art.

In another embodiment of card handling device 150", card recognition module 154" may comprise, as illustrated in FIG. 3(*c*), a microcontroller 222 operably coupled to a memory module 224. Microcontroller 222 may be configured to perform the functions of the communication module 146, the detection module 219, and the diagnosis module 212 (see FIG. 3(*a*)). As such, microcontroller 222 may be configured to establish communication with a network and transmit and receive information over the network by employing software or firmware stored on memory module 224. Of course, many microcontrollers suitable for the card recognition module 154", may include memory as part of the microcontroller 222. Therefore, a memory module 224 external to the microcontroller 222 may not be necessary.

In another embodiment, card recognition module 154" may include a hardware communication module 226. In this configuration, the communication function may be implemented completely in hardware, or may be a combination of hardware and software functions configured to establish communication with a network and thereafter transmit and receive information over the network.

Although the card recognition 154 module in the figures is shown as part of the shuffler 156, in other embodiments, the card recognition module 154 may be located in an external computer that communicates with the shuffler controller. In some embodiments, the communication can be direct, indirect, via a LAN, via a WAN including public cellular networks, a wired network/links, or any combination.

Figure 4:
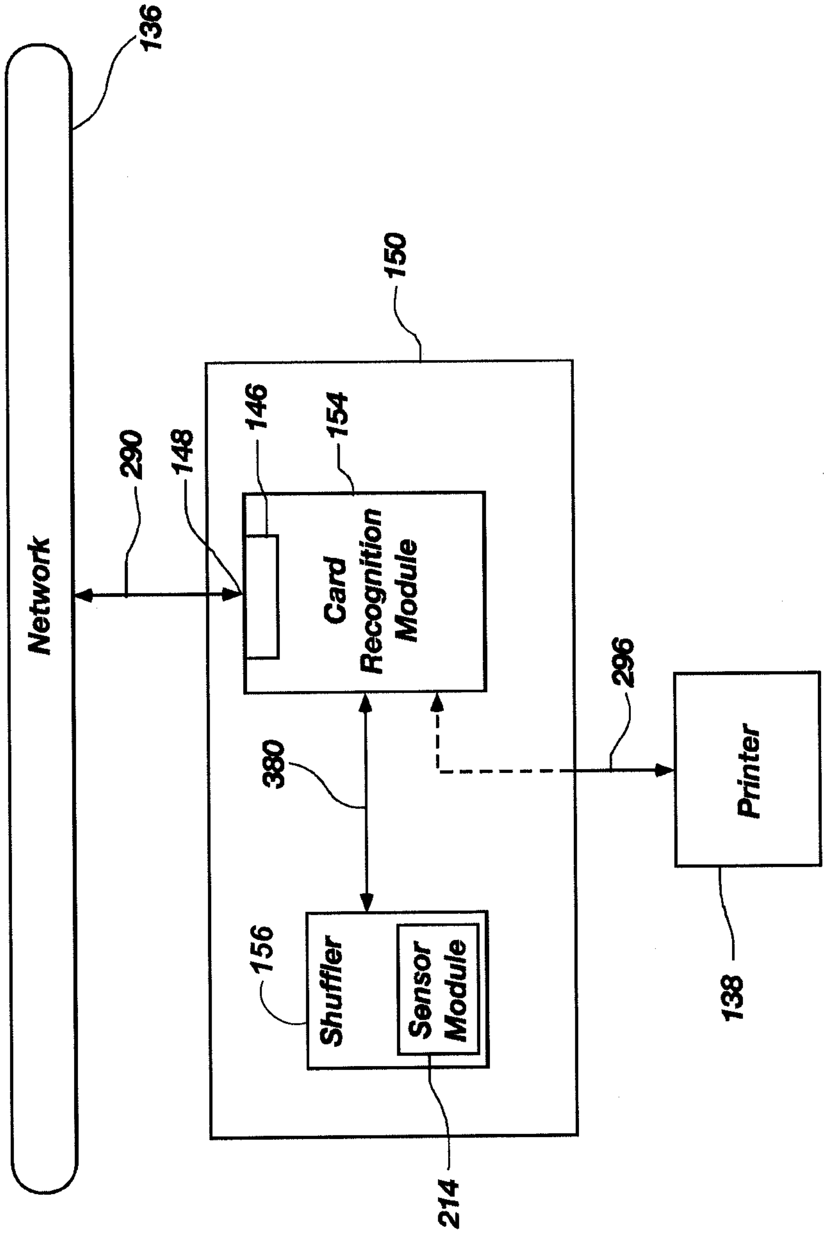
FIG. 4 is a block diagram of an embodiment of an automatic card handing device operably coupled to a local network.

FIG. 4 illustrates another embodiment wherein card handling device 150 is coupled to network 136. Card handling device 150 may comprise a shuffler 156 and a card recognition module 154 operably coupled together by way of connection 380. Additionally, card recognition module 154 may comprise a communication module 146 and a communication port 148 directly coupled to network 136 via communication link 290. Card recognition module 154 may also be operably coupled to printer 138 via communication link 296. As described above, communication module 146 may be configured to establish communication with network 136 and thereafter send and receive information over network 136, which, as described above, may comprise a local network and/or a wide area network, such as the Internet, public cellular network, etc. Communication links 290 and 296 may comprise any form of wireless or wired connections or any combination thereof.

The operation of card handling device 150 depicted in FIG. 4 will now be described. As a set of input cards is placed into card handling device 150, shuffler controller 156 is configured to shuffle the input set of cards, and sensor module 214 captures image information about each card, either before, during or after the shuffling process. The image information is sent to the card recognition module 154 where the detection module 219 (see FIG. 3(*a*)) processes the image information for each card to determine the rank and suit of each card. The image information may be transformed into a rank and suit by an image recognition process of the rank and suit designations on each card. As explained earlier, the image recognition process may be performed as software/firmware operating on the microcontroller 222 or may be performed by custom logic within the custom module 228 (see FIGS. 3(*a*)-3(*c*)). Card recognition module 154 may be configured to operate in multiple modes and may be capable of automatically switching between multiple modes without powering off or rebooting. By way of example, card recognition module 154 may be configured to operate in a set-up mode, a run mode, or a service mode.

In addition to shuffling and verifying the contents of an input set of cards, card handling device 150 may, at any time while powered on, establish communication with network 136. Thereafter, card handling device 150 may transmit the results of the shuffling and verification processes or any other data relating to the card handling device 150, such as, diagnostic messages, identity messages, simple or complex usage data, and location messages over network 136 to server 162 (see FIGS. 5 and 6). Furthermore, card recognition module 154 may be configured to send information comprising the shuffling, maintenance information, power, operational information, and card verification results to a printer 138 by way of communication link 296. Printer 138 may be configured to, upon receipt of the information, print a label or other report with information such as verification results that can then be affixed to the output set of cards.

Figure 5:
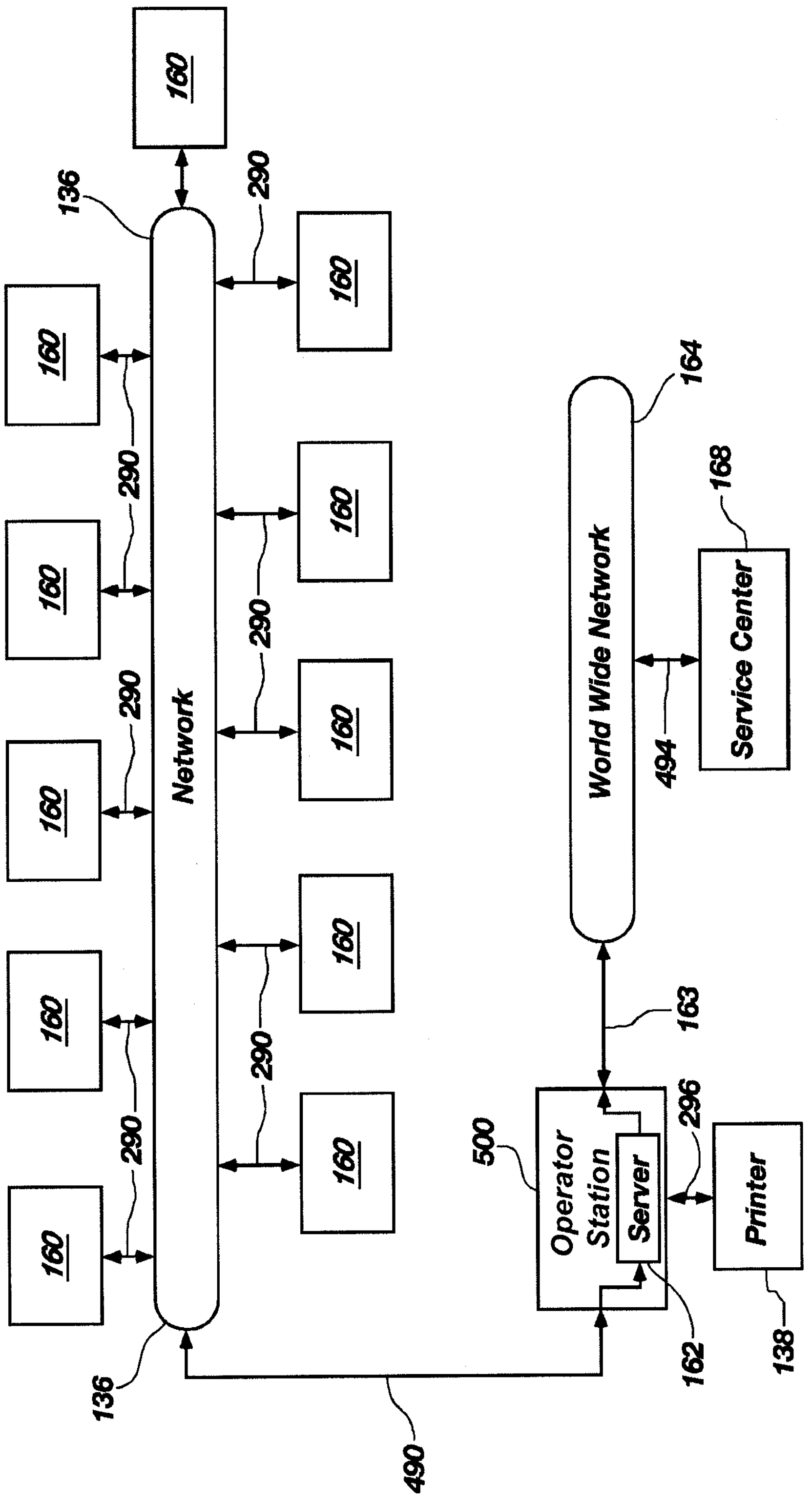
FIG. 5 is a block diagram of a network of an embodiment of an automatic card handling devices in accordance.

FIG. 5 illustrates an embodiment comprising a network of card handling devices 160. Card handling devices 160 may be located on a casino floor adjacent a playing table or in a back-room location off the casino floor and may be comprised of either card handling device 130 described in FIG. 2, or card handling device 150 described in FIGS. 3(*a*)-3(*c*) and 4. Each card handling device 160 is operably coupled to a network 136 over corresponding communication links 290. Network 136 may be operably coupled via communication link 490 to a server 162 located within operator station 500, which is a computerized machine control system. Operator station 500 and server 162 may be located within the casino property and may be operably coupled to printer 138 and a world-wide network, such as the Internet or a public cellular network, 164 by communication links 296 and 163, respectively. Server 162 may be located within operator station 500, as shown in FIG. 5, or may be located separate from, and operably coupled to, operator station 500. A service center 168, which may be located either on the casino property or at a remote location, may be operably coupled to server 162 across a LAN, WAN and/or other network 164 via communication links 494 and 163. Communication links 163, 290, 296, 490, and 494 may comprise any form of wireless or wired connections, or any combination thereof.

Figure 6:
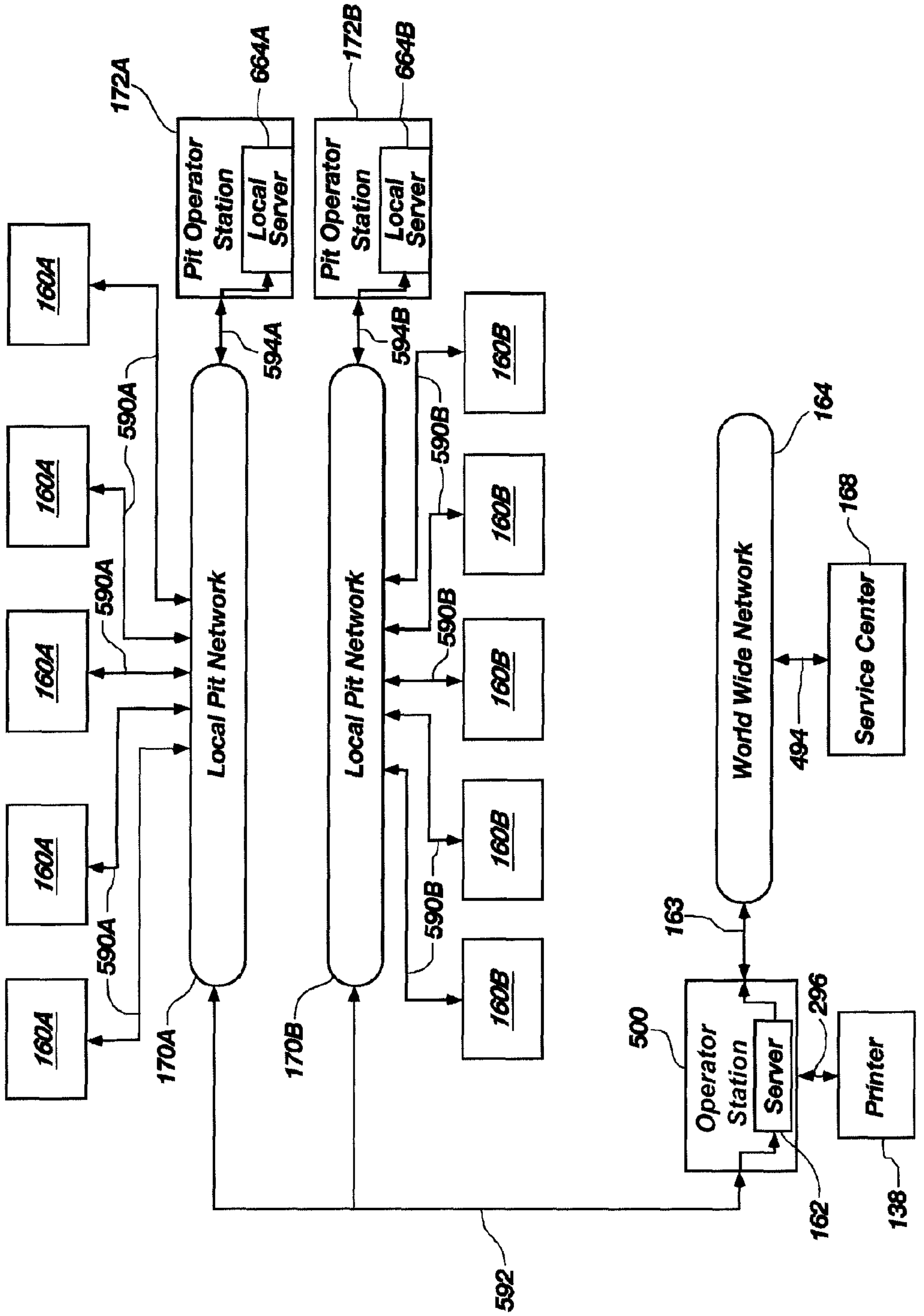
FIG. 6 is a block diagram of another embodiment of a network of automatic card handling devices.

The operation of the network of card handling devices depicted in FIG. 5 will now be described. At any time while a card handling device 160 is powered on, the card handling device 160 may establish communication with network 136 and thereafter transmit any information pertaining to the card handling device 160 across network 136 to server 162. As illustrated in FIGS. 5 and 6, server 162 is located within operator station 500. Therefore, any data received by server 162 may be accessed by a device operator within operator station 500. Conversely, if server 162 is located outside of operator station 500, any data received at server 162 may be forwarded to operator station 500. As such, a device operator accessing operator station 500 may receive the information and monitor the status of each card handling device 160. Upon receipt of any information, server 162 may be configured to store, mine, assemble, or forward the information to casino personnel or to a device technician located within service center 168. For example only, casino personnel or a device technician may receive the transmitted information by way of a graphical user interface (GUI) comprising a visual or alerting system on a computer, cell phone, or other like data receiving device.

By way of example only, card handling device 160 may be configured to transmit an email or a text message, containing the operational status of card handling device 160, to server 162 or directly to a cellular phone network. If transmitted to operator station 500, it may then transmit the email, text message, instant message and/or other messaging type, to service center 168 or any data receiving device belonging to casino personnel. A transmitted email or text message may comprise, for example, information detailing whether the input set of cards has successfully passed the shuffling and verification processes. If the input set of cards has failed the verification process, a transmitted email or text message may contain the reasons for failure, and may list the missing card or cards should the card handling device 160 detect a missing card or cards. Other data contained in an email, text message, or the like, may comprise information identifying the location of the card handling device 160, the name and location of the casino, and directions to the casino as well as the casino pit where the card handling device 160 resides. Card handling device 160 may also be configured, upon diagnosing a problem, to transmit an alert or a request across network 136 to server 162, or, to transmit an alert over a public cellular network to a preselected destination, including a central server at a casino (operator's property) and/or a server at the card device manufacturer's location. Further, server 162 may forward the alert or request to operator station 500, casino personnel, or to service center 168.

Card handling device 160 may also be configured to generate a report comprising a description of the location and relative performance of all the operational elements of card handling device 160. The generated report may then be transmitted electronically over network 136 to server 162, and/or to a server using a public cellular telephony connection. Server 162 may also forward the report to service center 168, or to a computer, cell phone or any other data receiving device belonging to a device technician or casino personnel. Upon receipt of a generated report, casino personnel or a device technician can quickly locate the corresponding card handling device 160 and, thereafter, may address current problems or future problems that may eventually exist in the corresponding card handling device 160. The report could generate a repair request, a preventative maintenance request, could identify the card handling device 160 as requiring a software upgrade, etc.

Additionally, the card handling device 160 may be configured to receive information comprising messages and instructions such as, work commands or a self-diagnosis request from a device operator located within operator station 500, a service center 168, or directly to an individual card device over its own public cellular telephony connection. As such, in addition to monitoring multiple card handling devices 160, a device operator located within operator station 500 may control multiple card handling devices 160 at any given time.

Additionally, a technician, located at a remote location such as service center 168, may perform troubleshooting routines or install software or firmware upgrades and patches on card handling devices 160 by using public cellular telephony communication links.

As described above, card handling device 160 may be configured to operate in multiple modes and may be capable of automatically switching between modes without powering off or rebooting. As such, a device operator may simultaneously control multiple card handling devices 160 by changing the operation mode of a card handling device 160 and thereafter running programs on, sending data requests, or sending work commands to the card handling device 160. By way of example and not limitation, a device operator or owner remotely located from any card device 160 may, using each card device's cellular connectivity, switch any particular card handling device 160 to a service mode and request a self-diagnosis, conduct troubleshooting routines, or install software updates and patches. Additionally, card handling device 160 may, upon receiving an input set of cards, automatically switch to a set-up mode and activate a calibration check in order to verify proper calibration before switching to a run mode to thereafter shuffle and/or verify the input set of cards.

FIG. 6 illustrates another embodiment comprising a network of card handling devices 160A networked together according to a common trait, such as physical location and/or game type. For example only, a network of card handling devices 160A located on a single casino floor or within a limited area of a single casino floor may be networked together. Likewise, for example, a network of card handling devices 160A pertaining to a specific game type, such as blackjack, may be networked together. Each card handling device 160A in a similar network is operably coupled by communication link 590A to a local pit network 170A, which may correspond to, as described above, the location or the game type of the card handling device 160A. Each local pit network 170A is, in turn, operably connected by communication link 594A to a local pit operator station 172A. As illustrated in FIG. 6, pit server 664A is located within pit operator station 172A. Therefore, any data received by pit server 664A may be accessed by a device operator within pit operator station 172A. Conversely, pit server 664A may be located outside of pit operator station 172A and any data received at pit server 664A may be forwarded to pit operator station 172A. In addition, each card handling device 160A or 160B has its own cellular phone connections over which it may communicate, and be communicated to, the same personnel just described, as well as personnel associated with a lessor or owner of the card devices (which may different than the casino operators).

As described above, at any time while powered on, each card handling device 160A located within a local pit network 170A may be configured to establish communication with local pit network 170A, and transmit information relating to its operation to pit server 664A. Also, each card handling device 160A may be configured to receive messages or instructions from pit server 664A. As such, a pit operator, located within pit operator station 172A, may simultaneously monitor and control each card handling device 160A located in the corresponding local pit network 170A. Each card handling device 160B may be networked together and directly coupled to a local pit network 170B in a similar fashion as described above in reference to each card handling device 160A; alternatively each card handling device 160A may be in communication with various servers using its cellular telephony capabilities, resulting in the same functionality results as far as operators or owners of the devices are concerned. In such cases, the hardware and software components of the operator or the card handling device owners would be compatible with cellular technology rather than, say, a hardwired LAN technology. Further, in some embodiments each card handling device will have both hardwired LAN and cellular WAN capabilities, and will be configured to use each network for different or perhaps overlapping purposes as programmed by the card device programmers. Card handling devices 160B may transmit and receive messages to and from pit server 664B over local pit network 170B.

In addition, local pit networks 170A/170B may be operably coupled to server 162, via communication link 592. Server 162 may be operably connected to a printer 138 via communication link 296. Service center 168 may be operably coupled to server 162 across a wide area network 164, e.g., Internet, cellular network, etc., via communication links 494 and 163. In addition to transmitting and receiving information to and from the pit server 664A/664B, each card handling device 160A/160B may, as described above, transmit and receive information to and from server 162 across local pit network 170A/170B and/or equivalently over a cellular network, or combination thereof. As such, a device operator located within operator station 500 may simultaneously monitor and control each card handling device 160A/160B of each local pit network 170A/170B. The operational data transmitted from each card handling device 160A/160B and received at server 162 may be viewed by a device operator, stored, mined, assembled, and/or simultaneously viewed by service center 168 when each device uses its cellular connection (not shown in FIG. 6). Additionally, the operational data may be transmitted to a computer, cell phone, or like data receiving device belonging to casino personnel. Communication links 296, 494, 590, 592, 594A, and 594B may comprise any form of wireless or wired connections or any combination thereof.

Additionally the card handling device 160A/160B may be configured to receive information comprising messages and instructions such as, work commands or a self-diagnosis request from a device operator located within operator station 500 or over its cellular connection. As such, in addition to monitoring multiple card handling devices 160A/160B, a device operator located within operator station 500 may control multiple card handling devices 160A/160B at any given time. Additionally, a technician, located at a remote location such as service center 168, may perform troubleshooting routines or install software upgrades and patches on card handling device 160A/160B by using an electronic communication link between the card handling device 160A/160B and a computer (not shown), or a cellular telephony link, to service center 168.

Figure 7:
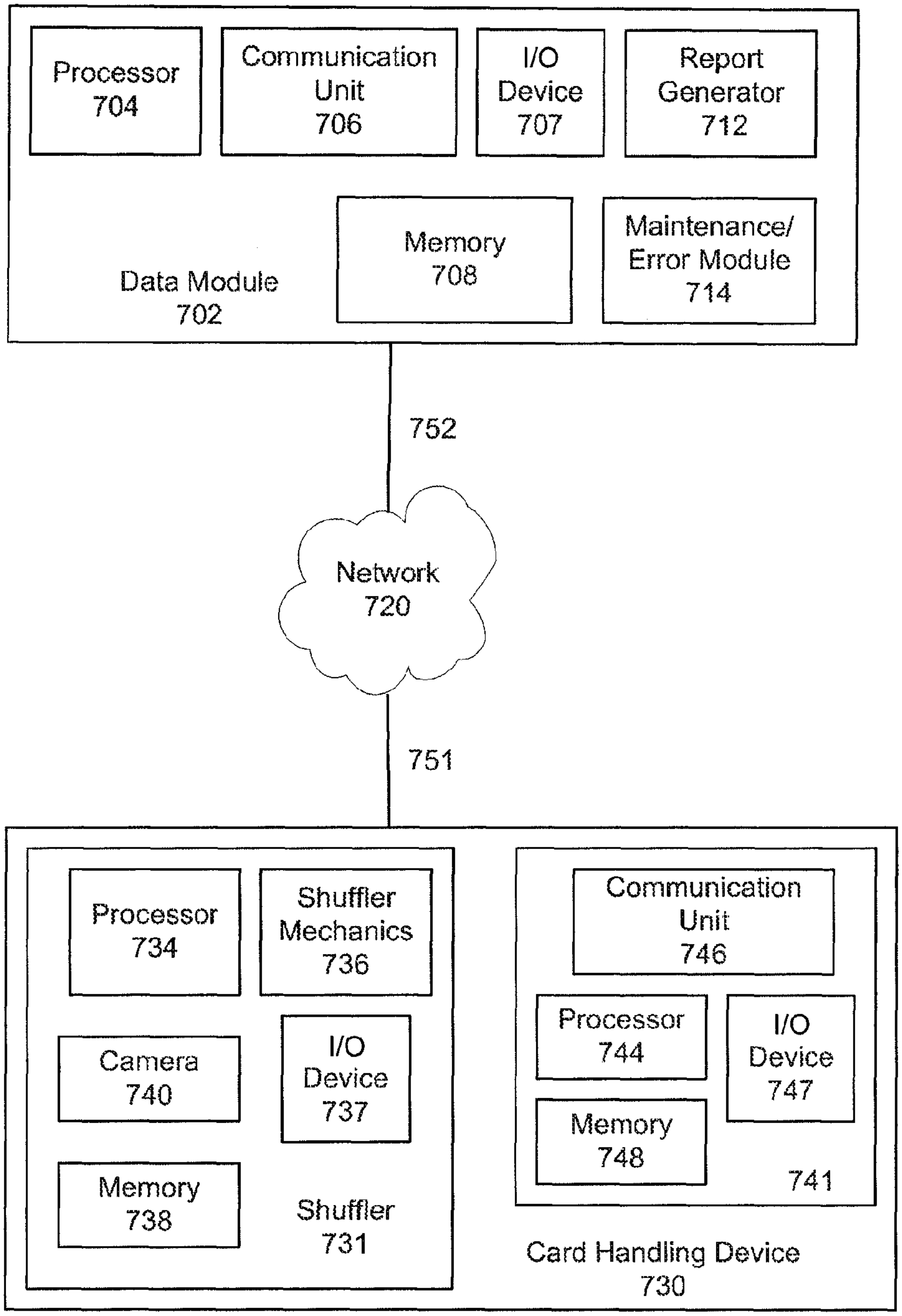
FIG. 7 is an illustration of an environment in which embodiments may operate.

FIG. 7 is an illustration of an environment in which embodiments may operate. A card handling device 730 can be similar to the card handling device 130 described herein. Card handling device 730 includes a shuffler 731 and computing device 741, the operation of which, in many respects, can be similar to card handling device 132 and computer 134 described herein. In an embodiment, the shuffler 731 includes a processor 734, shuffler mechanics 736, a camera 740, input/output device 737, and memory 738. Shuffler mechanics include physical components and subcomponents of shuffler 731. Examples of such components are described herein with reference to FIG. 2, for example. In some embodiments, the operation of the camera 740 is similar to the operation of camera 142, described herein.

The computing device 741 includes a processor 744, a communication unit 746, an input/output device 747 and memory 748. Data module 702 includes a processor 704, communication unit 706, input/output device 707, memory 708, report generator 712 and maintenance/error module 714.

The processors 734, 744, 704 process data signals and may comprise various computing architectures such as a complex instruction set computer (CISC) architecture, a reduced instruction set computer (RISC) architecture, or an architecture implementing a combination of instruction sets. Although only a single processor is shown, multiple processors may be included. The processors 734, 744, 704 comprise an arithmetic logic unit, a microprocessor, a general purpose computer, or some other information appliance equipped to transmit, receive and process electronic data signals from the memory 738, 748, 708, the input/output device 737, 747, 707, shuffler mechanics 736, and camera 740.

The memory 738, 748, 708 stores instructions and/or data that may be executed by processor 734, 744, 704. The instructions and/or data may comprise code for performing any and/or all of the techniques described herein. Memory 738, 748, 708 may be a dynamic random access memory (DRAM) device, a static random access memory (SRAM) device, Flash RAM (non-volatile storage), combinations of the above, or some other memory device known in the art. While the memory 738, 748, 708 is shown on the devices 702, 731, 741, some of the memory can be remote, e.g., on a separate device connected to the device or via a WAN, e.g., a cloud-based storage device.

Input/output device 737, 747, 707 provides an interface configured to provide inputs, send outputs to the device. Input devices can enable a user the ability to provide inputs to the input/output device 731, 741, 702. Output devices can be any device equipped to display electronic images and/or data.

Computing device 741 may be a part of shuffler 731 or may be a device separate from the card handling device 730, for example. In an embodiment, computing device 741 includes a communication unit 746 that communicates with network 720 via communication link 751. The network 720 also communicates with data module 702 via communication link 752. Network 720 can be any network, e.g., LAN, WAN, e.g., the Internet, public cellular network, etc. The communication links 751, 752 can be wireless/wired or a combination thereof, for example. In an embodiment the communication units 706, 746 can communicate using one or more of following communications methods: cellular protocols (e.g., GSM (Global System for Mobile Communications), TDMA, CDMA, etc), infrared communication, IEEE 802.11a/b/g/n/p communication, 3 G communication, 3GPP Long Term Evolution (LTE), IEEE 802.16 (or WiMax) communication, or other radio frequency communication. It is envisioned that other protocols/communication methods can be used.

Although only one card handling device 730 is illustrated in FIG. 7, in some embodiments, multiple card handling devices 730 communicate with data module 702. In an embodiment, each card handling device 730 can communicate directly with the data module, for example, via network 720. In one example, multiple card handling devices 730 include communication units 746 that have a cellular modem to enable communication with one or more data modules 702 via a cellular communication network 720. In another embodiment, multiple card handling devices 730 can be coupled to a single device having a communication unit that is capable of connecting to network 720. In one example, multiple card handling devices 730 are coupled to a device that is capable of communicating with data module 702 via a cellular communication network.

In some embodiments, data module 702 is positioned such that communication between data module 702 and card handling device 730 goes through network 720. Data module 702 includes a report generator 712 and a maintenance/error module 714. A feature of some embodiments is that information about the automatic card handling device 730, e.g., usage information, maintenance information, mechanical information, etc., can be sent to data module 702. The report generator 712 prepares reports such as detailed usage reports that enable the automatic card handling device 730 to be licensed/billed based on metrics such as per use, per session, per game play event, per session, per time period, etc.

The report generator 712 receives usage information from the card handling device 730 and identifies usage based on various usage parameters. Examples of such usage parameters include, (a) number of shuffles, (b) number of cards shuffled, (c) number of game play events, (d) number of game sessions, and/or (e) use of card handling device 730 in a time period, such as an hour or a defined multiple hour period such as a 24 hour period having any start time, for example.

The parameter of the number of shuffles can represent the number of full deck shuffles performed by the card handling device 730. When multiple decks are shuffled, the parameters can reflect the total number of decks shuffled. The parameter of the number of cards shuffled can represent the number of cards shuffled by the card handling device 730. In an embodiment when a particular card is shuffled multiple times over the course of a time period, the parameter is incremented each time the card is shuffled. In an embodiment, a card is shuffled once when the card is part of a shuffle process in which one or more decks of cards are completely shuffled.

The parameter of a game play event can represent the number of completed games/hands at a table. For example, one game play event for blackjack represents the dealing of cards between the placement of an initial bet and the final result of the hand. In one embodiment, if there are five players at a table, the completion of one hand for all players and the dealer represents five game plays, in some embodiment the dealer's hand is also counted so this represents six game plays, in another embodiment this represents one game play.

The parameter of a game session can represent a series of game plays/deals for a particular type of game played such as blackjack, THREE CARD POKER®, etc., without a significant break in play. For example, if a card handling device 730 is used for THREE CARD POKER® and is in continuous use, e.g., shuffling and dealing cards with no more than a five minute break (other break period criteria can be used), for six hours, then the card handling device 730 is used for blackjack, then the six hours of THREE CARD POKER® is one game play session.

The parameter of use in a period can represent the total amount of usage of the card handling device 730 in a period. Examples of usage are number of shuffles, number of cards shuffled, number of game play events, and/or game sessions. The data module 702 can identify usage over any period for a single card handling device 730 and/or a collection of card handling devices 730 where the collection can be in the same area of the casino floor, in the casino, or in different casinos, for example. The information can assist in identifying trends in the amount of game plays of particular games, e.g., THREE CARD POKER®.

The data module 702 can also receive maintenance and/or mechanical information about the automatic card handling device 730 and the maintenance/error module 714 can prepare a report, alert, alarm and/or other notification based on the information. For example, the maintenance/error module 714 can identify when a component/sub-component of a card handling device 730 is nearing an end-of-life metric and should be replaced. For example, different components/sub-components (mechanisms) of the card handling device 730 can wear at different rates depending on how the shuffler 731 is used. In one example, card handling devices 730 perform different tasks and, therefore the use of various sub-components differ, depending upon the game being played. Accordingly, the wear rate of some sub-components can vary based on the game being performed by the card handling device 730. The maintenance/error module 714 or the card handling device 730 or a processor coupled thereto, can keep track of the usage of various components/sub-components of the card handling device 730 and identify when such a component/sub-component is approaching an end-of-life usage parameter.

The maintenance/error module 714 can also identify when a component of the card handling device 730 has broken and needs repair or when the card handling device 730 is otherwise not operating properly, e.g., when the rate of erroneous shuffles exceeds a threshold. The maintenance/error module 714 may be able to anticipate a failure based on improper operation and can send a message informing the recipient that maintenance should be done; this message can be prior to the failure of the card handling device 730.

In some embodiments, and as described in greater detail below, the data module 702 receives information from the card handling device 730 as a result of a request for information. In other embodiments, the data module 702 receives the information without a prior request either directly or indirectly.

Figure 8:
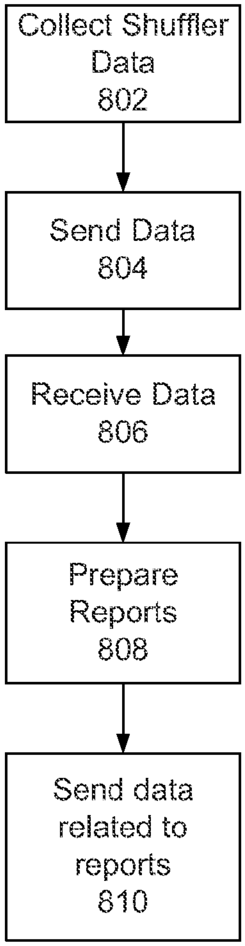
FIG. 8 is a flowchart of a method in accordance with an embodiment.

FIG. 8 is a flowchart of a method in accordance with an embodiment. The information about card handling device 730 is collected 802. As described above, the information can include usage data, error data or any other data related to the card handling device 730. For discussion purposes, it can be characterized as comprising two types of data. One is usage data, that is, data based on, and/or reporting, the type and kinds of use the card handling device card has been put to. Another is fault, error, and condition reporting. Note, that in actuality, there is always some overlap between these types of data and their use. For example, predictive maintenance and failure reports may be generated, in part or in whole, based on usage data and/or fault, error, and/or condition data. Billing reports, which are often based on usage data, may also include billable events due to failure, error, or predictive maintenance data that is used to generate a billable event, used to generate a billing report, or bill, to the user of the card handling device 730.

In an embodiment, usage data can include data related to the type of game, the number of cards shuffled, the number of cards dealt and in one embodiment will include a time stamp, for example. It is understood that at this level, what is being created are data logs, which are not typically in human readable form; the data logs may be strings of binary digits that have assigned meanings according to a protocol, a data type, a data structure, etc. In later processing, the data logs will be used to generate human readable reports and/or bills. The information can be stored in memory 738/748 (or memory in a separate device) until it is provided to the data module 702. The information is then sent 804 to the data module 702. As described above, the information can be sent from communication unit 746 or from a separate device. In one embodiment, the information sent is not in response to a request from the data module 702, rather, it is sent on a predetermined schedule or based on a preselected event. The predetermined schedule may be a regularly recurring time event, such as sending all data collected every 24 hours. Typically, the frequency of sending data will be selectable at the card handling device 730, and may be set remotely, or by a person having the needed authorization at the device. Event-based sending will typically be used when the card handling device 730 detects that a certain (preselected) type of log or interrupt event occurs. When these types of events occur, it has been predetermined that these events will be reported immediately, or, in a relatively short time frame compared to the regular reports. "Preselected" means that the types of events that are to be reported to a central location using networked connections, in one embodiment, a cellular connection, occurs sooner than the regularly timed sending of data, and, has been selected in some manner so the card handling device can determine, algorithmically, that the data is to be sent. In one embodiment, the card handling device is programmed so that when it detects fault interrupts or log entries that indicate a failure mode, the data indicating those conditions is sent as soon as technically feasible. Other events may be selectably programmable to send during the regular data sending periods, or earlier. In addition to events that do, or might, indicate a failure of some kind, other reportable events that may be sent as soon as possible after detection may be events that indicate an improper use by the user of the device. For example, if the card handling device is licensed to the user for specific locations and the device detects, using GPS or cellular tower location technologies, that it has been moved to unlicensed location, a report may be sent as soon as technically practicable. Other disallowed uses, such as certain games, may also trigger the sending of data soon as soon as technically practicable after detection.

Failure or unauthorized use may also be detected by data module 702 when it cannot communicate with any particular card handling device 730. If a regularly scheduled report does not arrive at data module 702 when expected, that indicates the device is unable to communicate due to device failure, due to a networking failure, due to communications being purposefully blocked, being in an unauthorized location that has no network capabilities, or other failures. Data module 702 may be programmed to re-try communications with card handling device 730 for a predetermined number of tries, and/or over a predetermined time period, after which it generates a report or alarm. An example of an alarm may be a report indicating it is of high importance, highlighting of the event on a user interface (lights, sounds, vibration, etc.), or other means indicating that the event requires attention by associated personnel. Note that the re-try settings including, but not limited to, attempts to establish communicate and/or attempts over a time period, may be quite short or small by human standards, such as micro- or milliseconds, for example, and may be dependent on the device, its location, the local infrastructure, and other factors. In one embodiment, the parameters associated with detection of a communications fault or non-responsive card handling device will be settable (selectable) at the location of data module 702.

The data module receives 806 the information. The information can be stored in memory 708 (or a memory device external (not shown) to the data module 702). The report generator 712 analyzes the data and prepares reports 808 identifying the data in a particular manner. In one embodiment, it is the report generator 712 that translates lower-level data and/or log entries into a form that can be used to directly generate, or already is, in human readable form. For example, the report generator 712, using the data and/or log information sent to it by a device, can generate a use report based on the type of data provided by the device. Different devices may have different types and/or amounts of use data to send, where the different types and amounts of data may be reflective of the sophistication of the device. Embodiments include the most simple to the very sophisticated. Simple devices may report relatively simple data, comprised of relatively few fields having to do with, for example, cards sorted, cards counted, cards or decks loaded, and/or cards dealt. More sophisticated devices may include data about types of games played, game hands dealt, game sessions, individual game play events, the cards dealt to each player, or location associated with a real or virtual player (a virtual player is a player's location or hand that is actually being controlled by a computer), and an associated relative value of each hand, time stamps for each event, and other more detailed information. The report information can be stored in memory 708, e.g., in a database format. The report generator can send 810 data related to the reports to other computers/printers/devices/memories. In one example, the usage of card handling devices 730 can be tracked to enable billing of the card handling device 730 to be based, at least in part, on the actual use of the device during the billing period.

As described above, embodiments permit the reporting period, and any associated billing period, to be of any duration and based on any type of, or combination of, use. In other embodiments, billing amounts may include maintenance charges, fees, or other payable service events. Types of use include, but are not limited to, cards or decks inserted into the card device, cards dispensed, cards counted, cards sorted, cards or decks checked for completeness, individual hands dealt, type of game played, individual games played, game sessions played, directly or indirectly based on any amount of winnings detected during play including any progressive, individual hand reports and game reports generated, and/or request for a report from a past card usage, past game or past session data including individual hands previously generated (past data may help a casino with a patron dispute, may help with a billing dispute, etc.). This may be downloaded to a card handling device from a central location where extended game data associated with each card handling device may be stored, or, otherwise provided to a user (casino, operator) of the local card handling device, if the device is unable to communicate or display the results of the request. Such data, billable events, and recallable events are based on the capabilities of each card handling device. The level to which each card handling device may record data in any form is reflected in the data kept at a central location for later recall, analysis, and use. Unsophisticated card handling devices with limited reporting capabilities will have equally limited data available from any back-end system, while sophisticated card handling devices will enable a back-end system to keep far more detailed records, respond to download requests for specific data and similar actions. The type of data available from a sophisticated card handling device is limited only by its detectors and associated computer power. Any type of data related to card usage, deck usage or deck type (including, but not limited to, the deck's manufacturer and other data), deck or card count of any kind, ordering in a randomized deck or partial deck, data for each dealt or issued card for any event (including card counting or deck determinations, as well as game play events), and any other type of count or event based on cards in any manner used in a card handling device is contemplated herein.

The collected data may be organized, analyzed, and reported in any manner useful for either billing, meaning creating bills for payment eventually sent to the user of the device, or, maintenance of any type, including actual and predictive failure analysis and/or predictive required maintenance reports. Predictive reporting may be based in part, or in whole, on statistical analysis of the use data, error logs, interrupt events, fault reports, and any and all data, if available, from detectors or detection circuits, detection ICs, or any type of element that has the ability to log or generate data regarding the condition of any element, either itself or another element.

Examples of detector elements includes elements such as strain detectors or motion detectors located on, or associated with, mechanical components, and, failure detection ICs measuring various electrical/electronic properties of components so that anomalous events can be reported or logged. Similarly, detection elements may be failure detection (or condition monitoring) circuits contained in larger circuits reporting/logging performance deviations or apparent out-of-spec behaviors, and/or any other detection elements that generate logs, interrupts, or other events. This further includes firmware or software that may use algorithms coupled with input from one or more components or elements of any type (mechanical elements using or interfacing to mechanical-electrical, mechanical-optical, or other elements, all electronic elements, etc.) to generate data or report on actual, possible, or predictive failure events. This is by way of example only, the concept covers collecting and/or using or evaluating any data from failure detection elements, as implemented in various models of card handling devices now or in the future.

Figure 9:
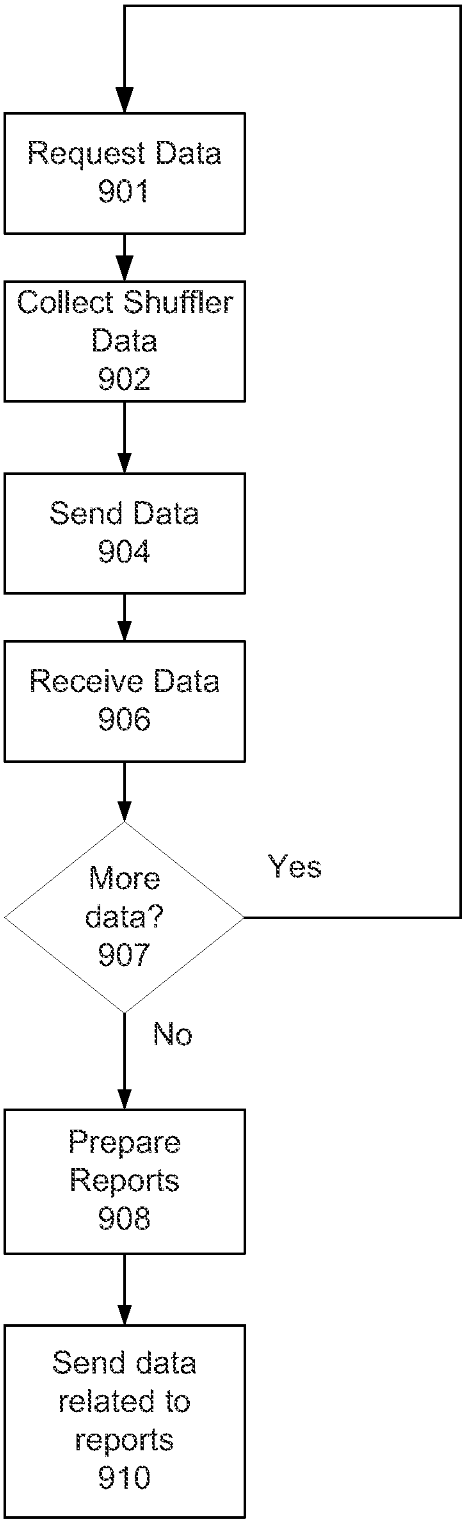
FIG. 9 is a flowchart of a method in accordance with an embodiment.

FIG. 9 is a flowchart of a method in accordance with an embodiment. In contrast to the method described in FIG. 8, the information sent by the card handling device 730 is in response to a request, for example, a request for information by the data module 702. The request can be to a single card handling device 730, multiple card handling devices 730 or to an intermediary computing device (not shown), which sends 904 the information. In this embodiment the data module 702 requests information 901 from the card handling device 730. For example, the data module 702 may request information about the number of cards shuffled by card handling device 730 in an 8-hour shift, e.g., a period from 8 p.m. to 4 a.m. The information about card handling device 730 is collected 902. As described above, the information can include usage data, error data, or any other data related to the card handling device 730. In an embodiment, usage data can include basic data related to the type of game, the number of cards shuffled, number of cards dealt and a time stamp, for example. The information sent 904 can include more information than what was requested. The information can be stored in memory 738/748 (or memory in a separate device) until it is sent to the data module 702. The information is sent 904 to the data module 702. As described above, the information can be sent 904 from communication unit 746 or from a separate device. The data module 702 receives 906 the information. The information can be stored in memory 708 (or a memory device external (not shown) to the data module 702). The data module 702 can request additional information 907 in which case a request is sent to the card handling device 730 or intermediary device, as described above. The report generator 712 analyzes the data and prepares reports 908 identifying the data in a particular manner. For example, the report generator 712 can identify the number of cards shuffled by card handling device 730 during the shift from 8 p.m. to 4 a.m. As described above, the report information can be stored in memory 708, e.g., in a database format. The report generator can send 910 data related to the reports to other computers/printers/devices/memories. In one example, the usage of card handling devices 730 can be tracked to enable billing of the card handling device 730 to be based, at least in part, on the actual use of the device during the billing period. As described above, embodiments permit the reporting period, and therefore the billing period, to be of any duration.

Embodiments will vary as to what and where data collection, reporting, and analysis are done. In some embodiments, a card handling device may be fairly simple and relatively inexpensive, and its data collection and reporting capabilities will reflect these limitations. In one embodiment, such a card handling device will do no data analysis at all; it will all be done at a server location (or other computer that eventually receives or has access to the data). At the other end of the spectrum may be multi-functional card handling devices having the ability to perform multiple card functions as well as support multiple card games, and further having their own displays, printers, and other components. Such sophisticated card handling devices may do some analysis of the data collected that enables them to generate, locally, at least one if not more of the billing reports usable by users of the device, in a manner readable by humans. This may include output to a printer or on a screen. This enables a casino or other user of the device to track their usage, current amount owed, possible servicing requirements, and other parameters.

It is expected that the most sophisticated data analysis regarding predictive failure analysis will be done centrally, at least in part because more sophisticated analysis uses data from many card handling devices. However, some or all of the results of such analysis may be downloaded to any individual card handling devices that are sophisticated enough to use them, typically in the form of what the card device may detect in terms of patterns in its own data. Examples of such patterns may include the occurrence of certain logged events during a specified time period from a component, or, certain data entries, measurements, interrupts, or logs from a set of components that by themselves do not raise an alarm, but do raise an alarm when they occur together, etc. Any and all patterns determined by data analysis are conceptually included herein.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A system for billing usage of an automatic card handling device, comprising:

a card handling device having a controller, the card handling device configured to physically shuffle an input set of cards and deliver an output set of cards resulting from the shuffling;

a communication device operably coupled to the controller, the communication device configured to at least send information including card handling usage parameters of the card handling device across a communication port, wherein the card handling usage parameters include information about operational acts performed by the card handling device associated with physical usage of the card handling device in play of a game; and a computing device, remote from the card handling device, operably coupled to the communication port through a network, the computing device configured to receive the information including the card handling usage parameters of the card handling device, and configured to generate a usage fee for use of the card handling device based at least in part on the card handling usage parameters of the card handling device.

2. The system of claim 1, wherein the communication device is further configured to receive the information from the controller, and to transmit the information to the computing device responsive to receiving a request from the computing device via the communication port.

3. The system of claim 1, wherein the communication device is further configured to transmit the information to the computing device responsive to a trigger selected from the group comprising at least one of: a passage of an amount of time, a time of day, a predetermined schedule, and a predetermined event.

4. The system of claim 1, wherein the card handling usage parameters comprise at least one of: a type of game, a number of shuffles, a number of cards shuffled, a number of cards dealt, a number of game play events, a number of game sessions within a time period, and a time stamp.

5. The system of claim 4, wherein a number of game play events includes a number of hands dealt.

6. The system of claim 5, wherein a number of hands dealt includes hands dealt to both a player and a dealer.

7. The system of claim 1, wherein the information further comprises failure information of the card handling device.

8. The system of claim 7, wherein the failure information comprises data indicative of a shuffling error, failure of a component of the card handling device or a component of the card handling device exceeding an end-of-life usage parameter.

9. The system of claim 8, wherein the end-of-life usage parameter is based on a game type being dealt by the card handling device.

10. The system of claim 7, further comprising:

a positioning device configured to determine a location associated with the card handling device, wherein the failure information comprises an indication the location is not within an authorized location.

11. The system of claim 1, wherein the usage fee is generated based on at least one of: service events, cards or decks inserted into the card handling device, a number of cards dispensed, a number of cards counted, a number of cards sorted, a number of cards or decks checked for completeness, a number of individual hands dealt, a type of game played, a number of individual games played, a number of game sessions played, and an amount of winnings detected during play.

12. The system of claim 1, wherein the card handling usage parameters comprise at least one of: a number of deck shuffles, a number of cards shuffled, and a number of intermediate game play events.

13. The system of claim 1, wherein the card handling usage parameters comprise a number of game play events that include at least one of: a number of a number of cards dispensed and a number of hands dispensed by the card handling device.

14. The system of claim 1, wherein the card handling usage parameters comprise at least one of: a number of game sessions and use of the card handling device during a time period.

15. The system of claim 1, wherein the card handling usage parameters are used to generate the usage fee based on at least one of: a price per powered-up time, a price per card shuffled, a price per card delivered, a price per game-play, a price per game-play-per-player, a price per game session, a price per game session per average player, and a price per card count.

16. The system of claim 15, wherein a price per game-play includes a price per hand dealt.

* * * * *